W. F. CONKLIN & E. B. TODD.
PLUNGER ACTUATING MECHANISM FOR PICKLING TANKS.
APPLICATION FILED JUNE 16, 1917.
1,243,488.
Patented Oct. 16, 1917.
6 SHEETS—SHEET 4.
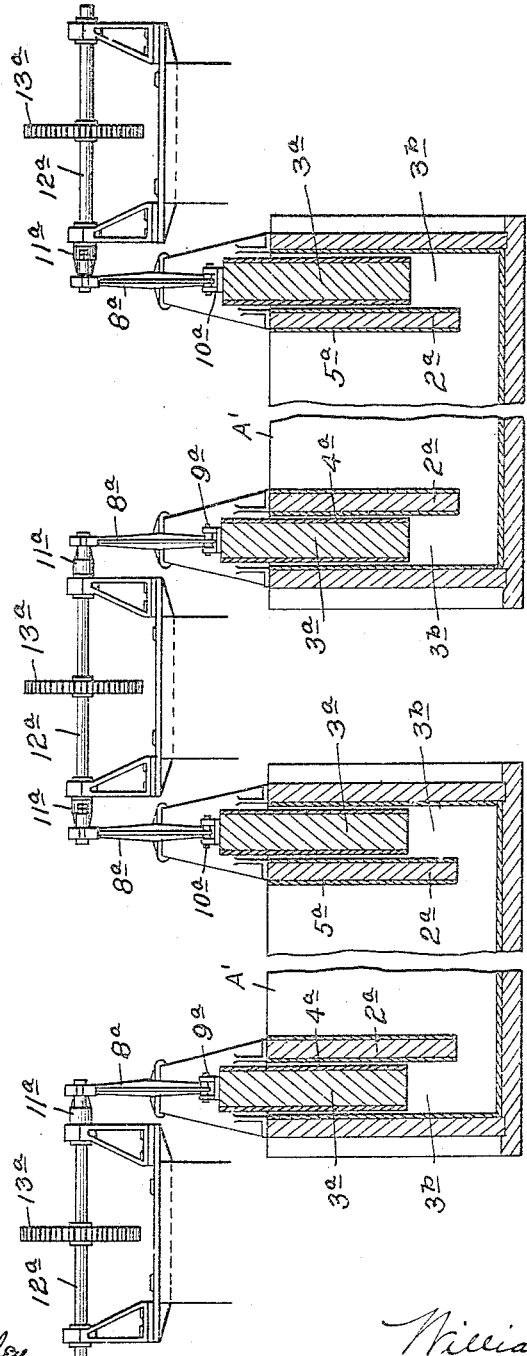
WITNESSES
INVENTORS

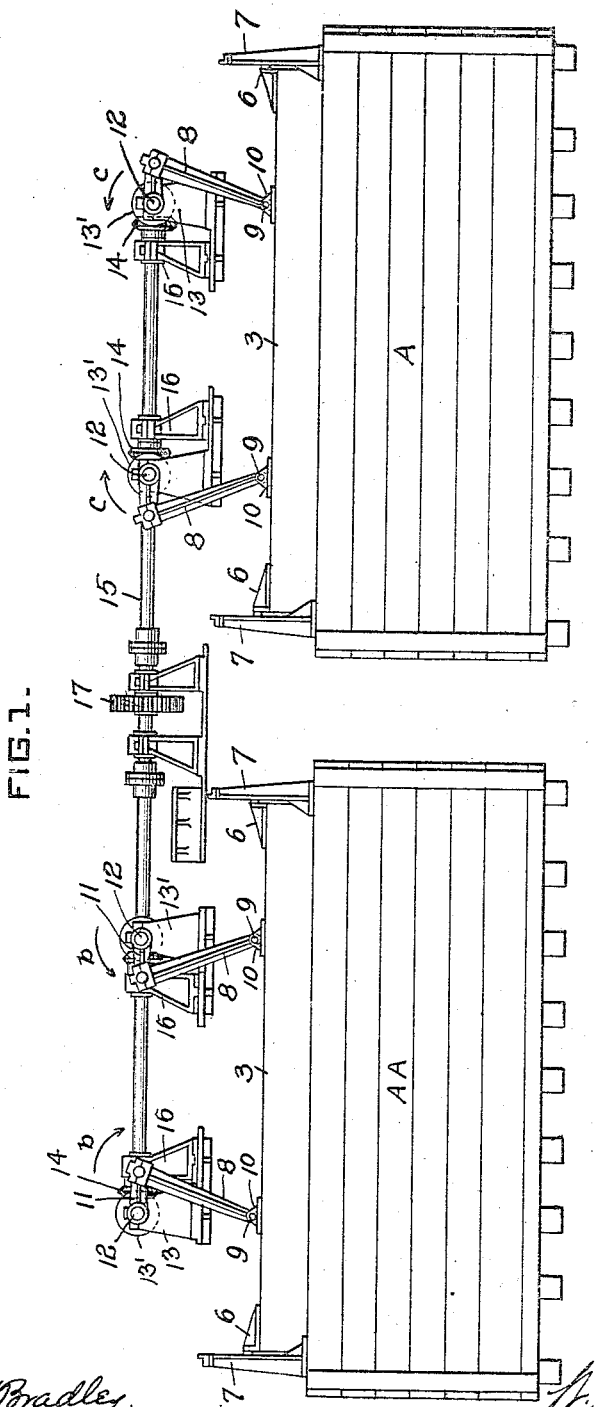

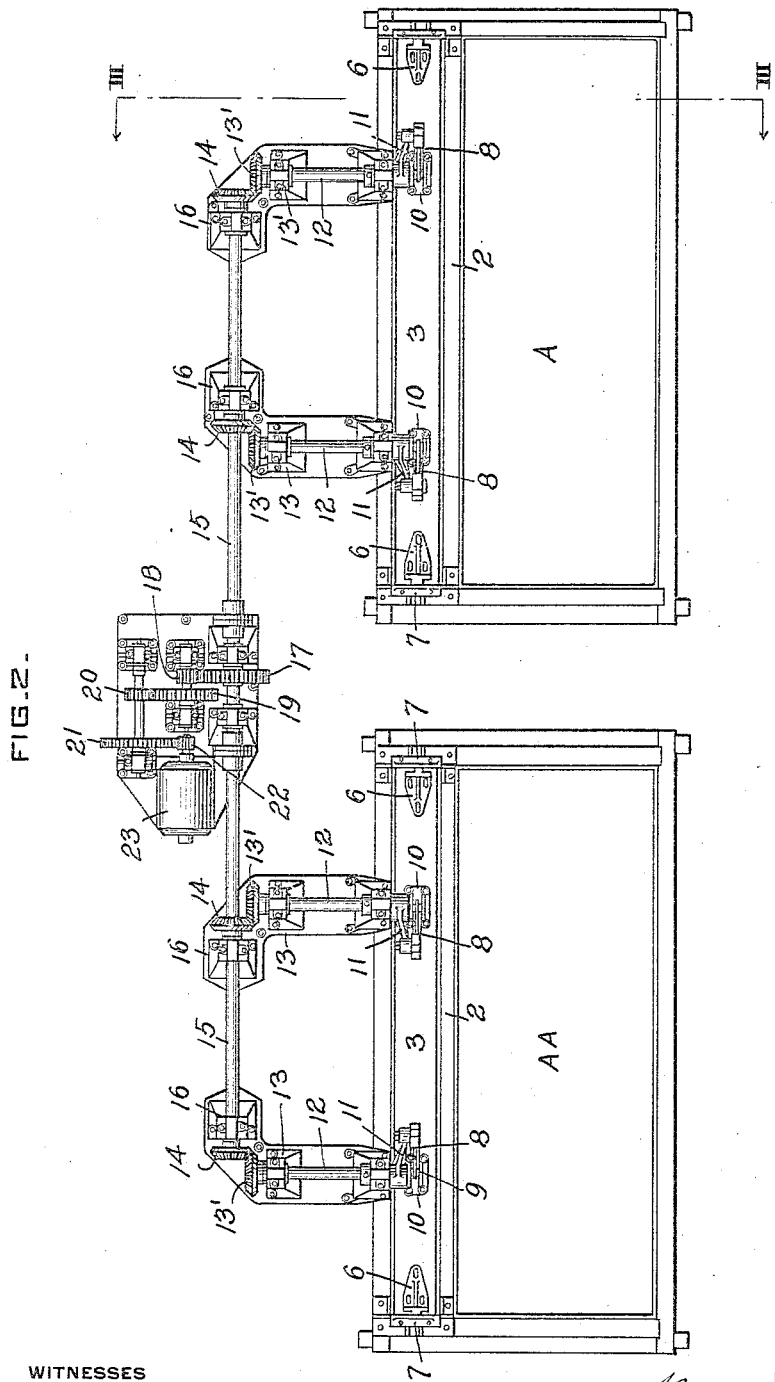

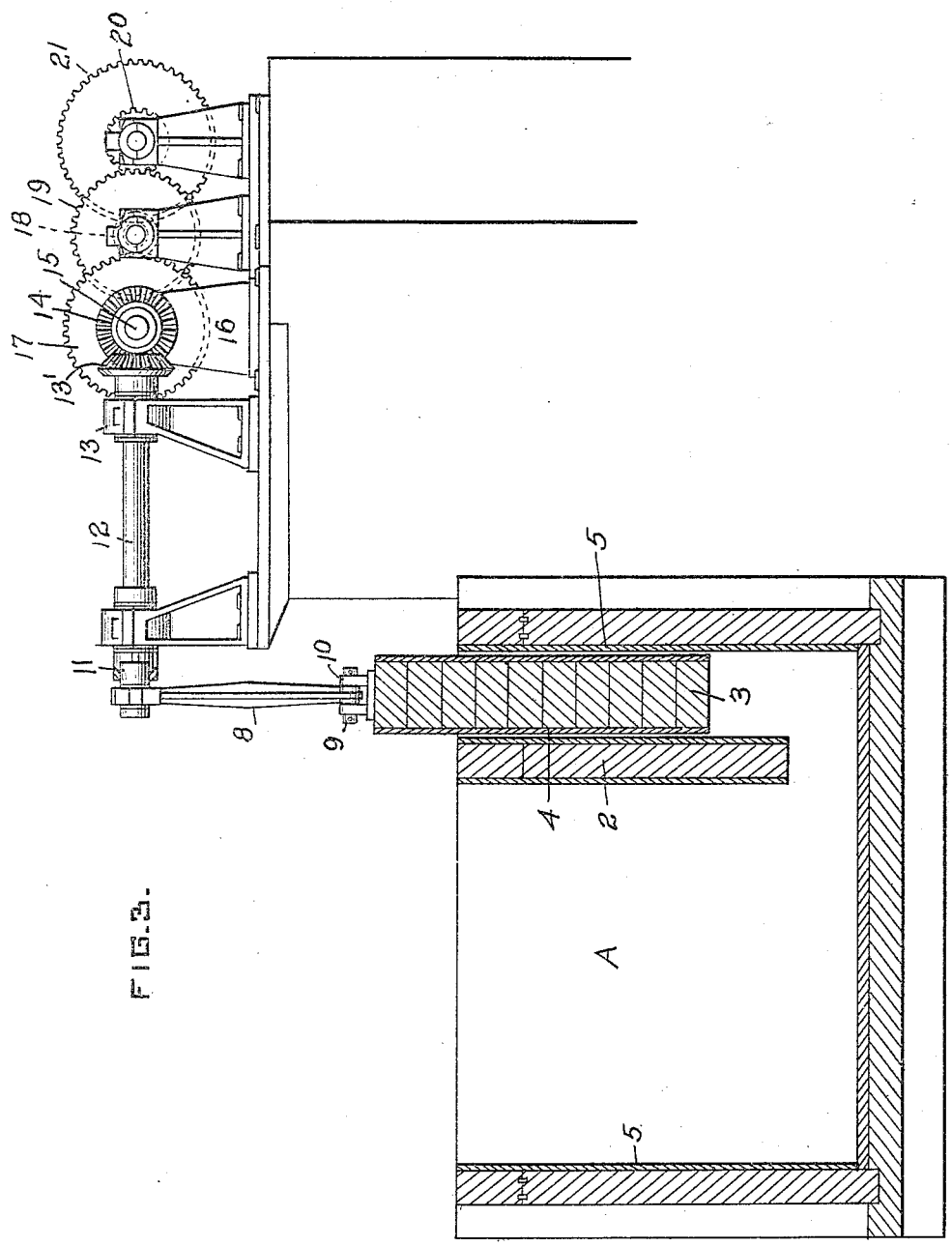

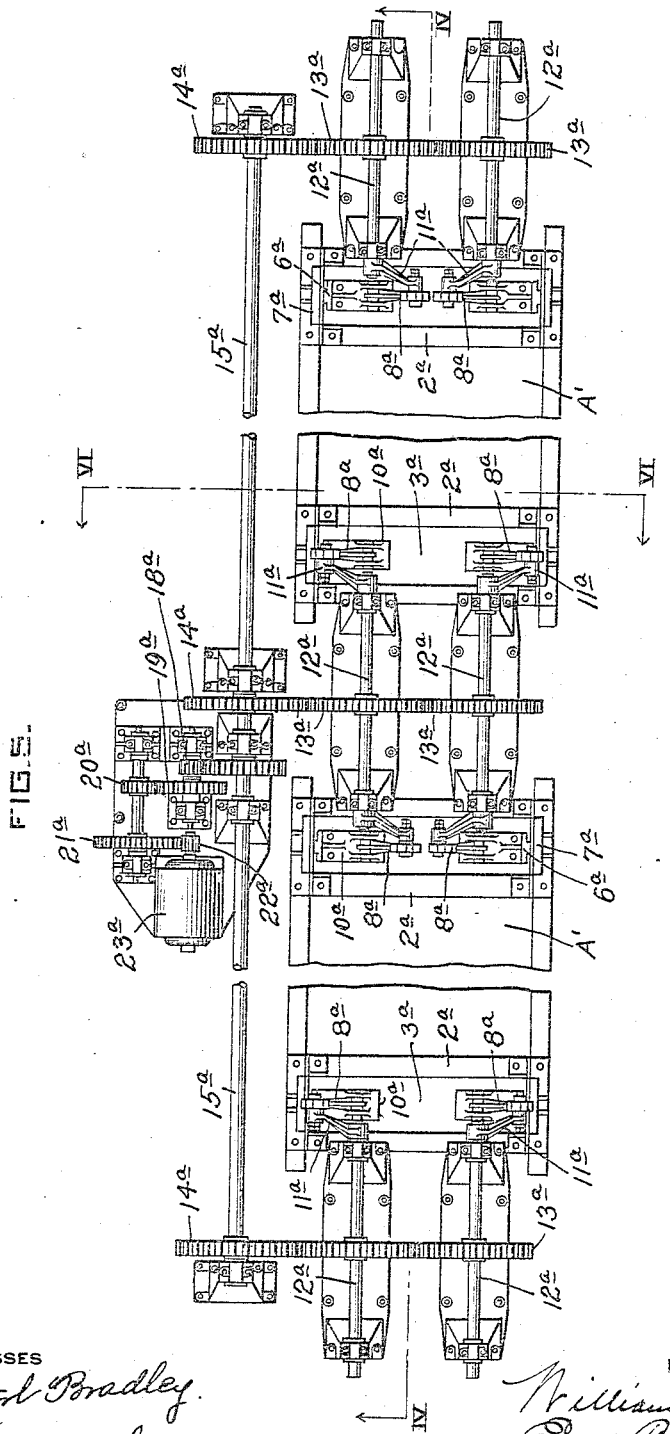

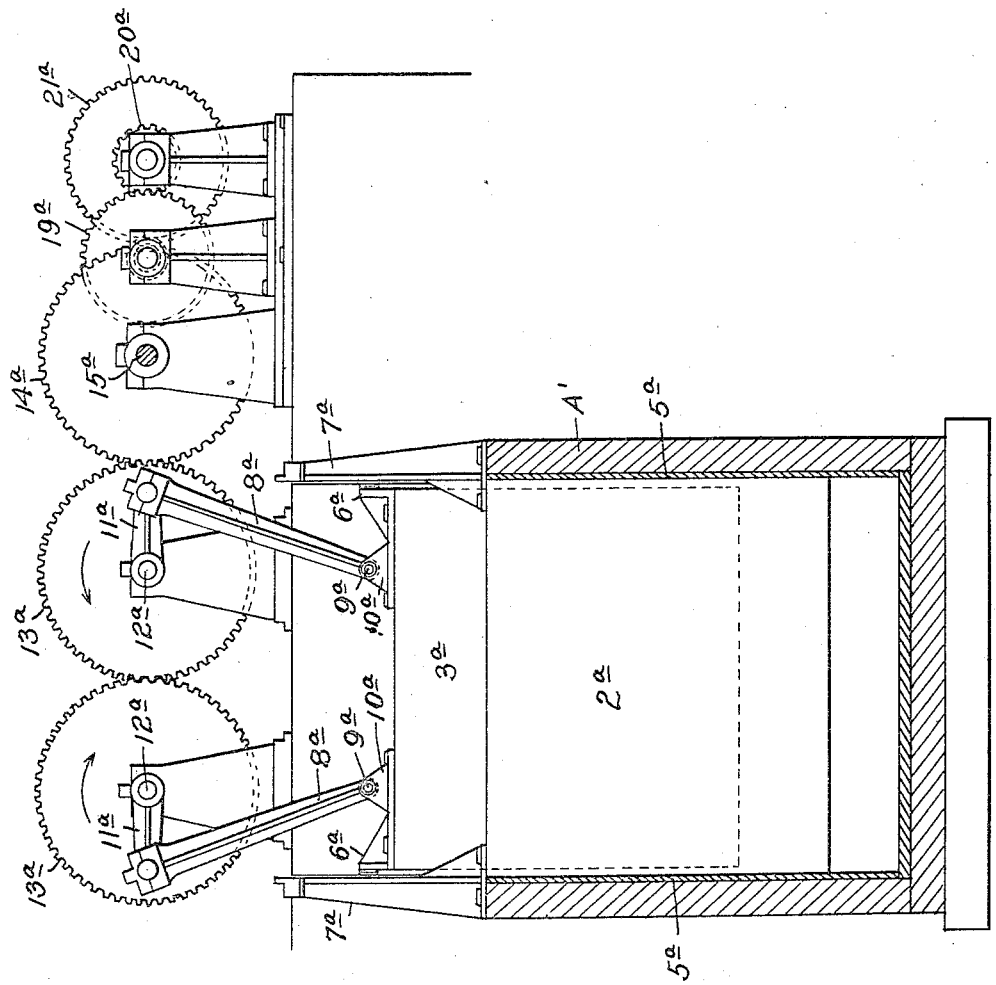

UNITED STATES PATENT OFFICE.

WILLIAM F. CONKLIN, OF TARENTUM, AND EARL B. TODD, OF BRACKENRIDGE, PENNSYLVANIA.

PLUNGER-ACTUATING MECHANISM FOR PICKLING-TANKS.

1,243,488.   Specification of Letters Patent.   Patented Oct. 16, 1917.

Application filed June 16, 1917. Serial No. 175,180.

*To all whom it may concern:*

Be it known that we, WILLIAM F. CONKLIN and EARL B. TODD, citizens of the United States, residing at Tarentum and Brackenridge, respectively, in the county of Allegheny and State of Pennsylvania, have invented certain new and useful Improvements in Plunger-Actuating Mechanism for Pickling-Tanks, of which the following is a specification.

Our invention relates to improvements in plunger mechanism for pickling machines, of the class used for pickling or galvanizing metal, and the invention has in view to provide, either in a single or a double plunger pickling machine, or series of such machines or tanks, mechanism for actuating the plunger, so constructed as to effect its even, regular action as hereinafter described, with relation to a companion plunger.

Heretofore in apparatus of this kind it has been customary to actuate the plunger or plungers by means such as levers, single arm pitmen, etc., for the purpose of imparting the up and down reciprocating motion, but without attaining the advantages of equalization and balancing of weight, even distribution of the power, and the resulting advantages in operation, due to the construction and arrangement of the parts in our present invention. Because of the elimination of pins, levers, etc., lost motion is reduced to a minimum or practically eliminated.

In the accompanying drawings, illustrating certain preferred constructions:

Figure 1 is a general view in elevation showing one arrangement of the invention as utilized in connection with a pair of single plunger tanks.

Fig. 2 is a plan view of the construction of Fig. 1.

Fig. 3 is a cross sectional view indicated by the line III, III of Fig. 2.

Fig. 4 is a longitudinal vertical sectional view, partly broken away, indicated by the line IV, IV of Fig. 5 and showing the application of the invention to a plurality of tanks, each having a pair of alternately operable plungers.

Fig. 5 is a plan view of the construction shown in Fig. 4.

Fig. 6 is a cross sectional view taken on the line VI, VI of Fig. 5.

Referring to the construction illustrated in Figs. 1, 2 and 3, each tank A, of which there are preferably two, or more as desired, in pairs, is of the usual or ordinary construction adapted to provide for the reception of the mass of articles to be pickled, as plates, sheets, coiled strip metal, pipes, bars, rods, or the like. Each tank A is provided along one side with a plunger chamber separated from the main tank interior by a partition 2, in which chamber is located the reciprocable plunger 3. It will be understood that partition 2 extends to within a short distance of the bottom of the tank, leaving a communicating space, whereby to provide for the back and forth movement of the fluid contents in connection with the reception of the plunger, to effect the desired circulation and surging wash of the liquid. The plunger 3 is preferably provided with a facing 4 of suitable plates and the plunger chamber is also lined with similar plates 5, provided for accurate fitting and easy motion. Endmost guides 6 are also provided, engaging vertical guideways or tracks 7 at each end of the plunger chamber, as clearly shown in Fig. 1. Each plunger 3 is actuated by a pair of pitmen 8, 8, pivotally connected at 9, 9, by pins with supporting pivoting brackets 10, 10, secured to the upper edge portion of the plunger. These connections are so located as to evenly distribute the weight and power at each side of the transverse center of the plunger, whereby the plungers 3 are operated in a perpendicular plane, due to the oppositely opposed pull of the cranks 11. If desired, the guides 6 may be dispensed with.

The pitmen are actuated by cranks 11, 11, of shafts 12, 12, mounted in the suitable pillow blocks 13, 13, of supporting frame work, whereby to locate the shafts 12 and their cranks 11 in operative position with relation to the pitmen 8. Shafts 12 are purposely rotated in opposite directions, whereby to correspondingly effect rotation of cranks 11. By this means the transmission of power through pitmen 8 is effected, as to each crank, under exactly the same conditions and with a resulting equal application of power at all positions of the cranks, either in lifting or lowering the plunger. The effect of this motion is that the plunger is raised and lowered at exactly the desired speed of movement and with a very even distribution and unvarying operation as to power.

At their other ends shafts 12 are provided with miter gears 13' which gear into driving miter gears 14, 14, of driving shaft 15, mounted in suitable pillow blocks 16. Shaft 15, which as shown in Fig. 2 is arranged continuously along for both tanks A, A, is provided with a driven gear 17 and by a train of gearing 18, 19, 20, 21, and the usual accompanying shafting, bearings, etc., power is transmitted from driving pinion 22 of motor 23.

The construction of the companion tank A, A, as shown, or of additional pairs of tanks, is the same as above described, it being understood that shaft 15 may be extended to any practicable length.

In operation, the cranks and pitmen having been properly set and located, as indicated in Fig. 1, which shows the position at the middle of the stroke, rotation of the shafting 12, 12 and cranks 11 in opposite directions effects operation of the pitmen in the manner above indicated and with a resulting alternating motion of the plungers of the two tanks with the accompanying resulting advantages.

As will be observed, the pair of pitmen 8, 8, and their cranks 11, 11, of tank A, A, are similarly arranged as to each other and the plunger, as in the case of tank A, but are set around 180° so that they will be swinging down when the other set of pitmen and cranks is swinging up. This movement is indicated by the arrows $b$, $b$, and $c$, $c$, Fig. 1. The result is that one of the plungers 3 balances the other and to a large extent reduces the necessary power.

In Figs. 4, 5, and 6, I show the same general arrangement of the parts, as to the driving mechanism and their connection with the plungers by the pairs of pitmen $8^a$, with the several other attendant parts, similarly indicated by numerals having the exponent $a$. In such case, however, each tank A' is provided with a partition $2^a$ across each end portion, dividing the main tank from the plunger chamber $3^b$, in which is mounted the reciprocable plunger $3^a$.

In such construction, each plunger is actuated by the pair of pitmen $8^a$ arranged and operating as to their driving cranks $11^a$ in the same way as above described (see Fig. 6). The plungers $3^a$ themselves are also operated alternately, as indicated by the arrows in Fig. 4, thereby accomplishing equalization of the load in the same way as in the case of the oppositely acting single plungers already described. The object of such arrangement will be obvious. The movement of the fluid is facilitated by the downward action of the plunger at one end of the tank and the simultaneous upward movement of the other plunger at its opposite end, this movement continuing alternately throughout the operation and effecting an alternating back and forth surging current movement of the fluid.

In both arrangements described the distribution of the fluid is very complete, thorough and rapid and effects a correspondingly high efficiency in the pickling operation. The load of the machine is equally distributed with a resulting great economy of power and resulting ease of operation.

In the construction in which there are plungers at each end of each tank, it will be seen that one plunger is balanced by the other, whereas in the single plunger tank construction previously described, the plungers of the individual tanks are purposely mounted and arranged to themselves operate alternately, as to each other. By this means the same balancing of the plungers is provided for and secured. It will thus be seen that when machines are built in pairs, either as to the individual tanks, or as to the tanks having pairs of plungers, that the mounting, supporting, and driving operation of the plungers contributes very materially to the efficiency and economy of the operation of the apparatus as a whole.

As will be seen the arrangement of the gearing in the double plunger tanks is somewhat different than that already described, the crank shafts $12^a$ being so arranged and mounted in their bearings $13^a$ as to provide for the attachment of the cranks $11^a$ at each end, with the train of pinion gears $13^a$, $13^a$, $14^a$ in continuous alinement, shaft $15^a$ and gears $17^a$, $18^a$, $19^a$, $20^a$ and $21^a$ transmitting movement from pinion $22^a$ of motor $23^a$.

The construction and operation of our invention will be readily understood and appreciated by all those familiar with this class of apparatus. It provides a simple, direct, and economical application of the operating power and greatly contributes to the general efficiency of pickling apparatus of the class involved.

What we claim is:

1. Actuating mechanism for a pair of reciprocating plungers comprising a pair of pitmen therefor pivotally connected with each of the plungers at points equi-distant from the center thereof, a pair of cranks for each of said pairs of pitmen operating in opposite directions and so timed as to assume the upper and lower vertical positions simultaneously, a common drive shaft for said mechanism, stub shafts for each of said cranks geared to said drive shaft, said cranks being so arranged and geared as to be adapted to raise one of said pairs of pitmen to their extreme upper vertical position while the other of said pairs of pitmen are moved to their extreme lower vertical position, thereby balancing the consumption of power.

2. An operating mechanism for a pair of plungers comprising a pair of pitmen pivotally connected with each plunger at points equi-distant from the center thereof, a pair of cranks for said pitmen operating in opposite directions and so timed as to assume their upper and lower vertical positions simultaneously, a stub shaft for each of said cranks, a common drive shaft geared to said stub shafts, and said pairs of pitmen being so arranged as to raise one of said plungers to its extreme upper vertical position while the other of said plungers is moved to its extreme lower vertical position, thereby effecting a balancing of one plunger by the other, substantially as set forth.

3. An operating mechanism for plungers, comprising a pair of pitmen pivotally connected with each plunger at each side of the vertical center thereof, a pair of positively revolving cranks for each pair of pitmen, an operating mechanism therefor so timed and operated as to raise one of said plungers to its extreme upper vertical position while the other of said plungers is moved to its extreme lower vertical position, thereby effecting a balancing of one plunger by the other, substantially as described.

In testimony whereof we hereunto affix our signatures.

WILLIAM F. CONKLIN.
EARL B. TODD.

Copies of this patent may be obtained for five cents each, by addressing the "Commissioner of Patents, Washington, D. C."